United States Patent [19]

Velie

[11] Patent Number: 4,848,313

[45] Date of Patent: Jul. 18, 1989

[54] COMPACT FORCED AIR HEATER

[75] Inventor: Wally W. Velie, Ontario, Calif.

[73] Assignee: Scheu Manufacturing Company, Upland, Calif.

[21] Appl. No.: 119,128

[22] Filed: Nov. 10, 1987

Related U.S. Application Data

[63] Continuation-in-part of Ser. No. 29,010, Mar. 23, 1987, abandoned, which is a continuation-in-part of Ser. No. 765,513, Aug. 14, 1985, Pat. No. 4,651,711.

[51] Int. Cl.$^4$ ................................................ F24H 3/02
[52] U.S. Cl. ............................. 126/110 C; 126/99 D; 126/110 B; 126/110 D; 431/171; 431/350; 432/222
[58] Field of Search ............. 126/99 D, 110 B–110 D, 126/116 A, 116 B; 431/47, 171, 347, 350, 354, 263; 432/222

[56] References Cited

U.S. PATENT DOCUMENTS

| | | | |
|---|---|---|---|
| 3,077,920 | 2/1963 | Pavlak | 431/285 |
| 3,816,055 | 6/1974 | Lear | 431/171 |
| 3,840,330 | 10/1974 | Katchka | 431/285 |
| 4,086,053 | 4/1978 | Sommer, Jr. | 432/222 |
| 4,424,793 | 1/1984 | Cooperrider | 126/110 B |
| 4,676,737 | 9/1985 | Suzuki | 431/328 |

FOREIGN PATENT DOCUMENTS

1201649 3/1986 Canada ................................. 431/350

OTHER PUBLICATIONS

Brochure, National Riverside Co., "Instructions and Parts List for Models 60FA–BA", publ. Sep. 1984.

Primary Examiner—Martin P. Schwadron
Assistant Examiner—Allen J. Flanigan
Attorney, Agent, or Firm—Fleit, Jacobson, Cohn, Price, Holman & Stern

[57] ABSTRACT

A compact forced air heater comprises a combustion chamber mounted in a housing, a burner module mounted across a back open end of the combustion chamber adjacent a back wall of the housing for producing heated air in the combustion chamber, an air intake in a front wall of the housing, and a high speed (3000 rpm) forced air blower mounted between the combustion chamber and the housing front end wall. The burner module includes a flameholder plate having a central primary air hole and circular rows of staggered secondary air holes surrounding the primary air hole. A flamespreader plate is mounted on the flameholder plate opposite the primary air hole, and an elongated right-angle burner tube, having a flattened locating-and-orienting end and at least one burner orifice in a sidewall of the tube, is located on an opposite side of the flameholder plate with the burner orifice aligned with the primary air hole and the flamespreader plate. An ignitor and a thermocouple are also mounted on the flameholder plate. The flameholder plate may be mounted vertically, with corners of the plate bent to form ears for increasing air turbulence and to act as afterburners.

25 Claims, 4 Drawing Sheets

COMPACT FORCED AIR HEATER

This is a continuation-in-part of application Ser. No. 029,010, filed Mar. 23, 1987, now abandoned which is a continuation-in-part of application Ser. No. 765,513, filed Aug. 14, 1985, now U.S. Pat. No. 4,651,711.

BACKGROUND OF THE INVENTION

1. Field of the Invention

This invention relates to a forced air heater, and more particularly to a compact, inexpensive forced air heater of the direct gas-fired, portable type which provides higher heating efficiency, cleaner combustion and has a significantly improved BTU output capacity per unit volume in comparison to prior known heaters.

2. Description of the Prior Art

Numerous types of gas-fired air heaters have been developed and are known in the art. The most common type is typically tubular in shape, wherein a motor-driven fan pushes air through a burner combustion chamber and out of a heater exit, as disclosed in the U.S. Pat. No. 4,244,349 issued to W. W. Velie on Jan. 13, 1981. A less common type is of a box-shaped configuration, rather than tubular, wherein air is pulled, rather than pushed, through the combustion chamber. These latter units use a forced air blower, rather than a fan, because a blower incorporates a blower housing which isolates the blower motor from the hot gases produced in the combustion chamber. These latter style heaters have more specialized applications where such items as flame containment, low noise and/or better heat distribution are important. The development goal for such heaters is to optimize size, performance and cost. For example, a known heater of this type is manufactured by the National-Riverside Company, a Division of Scheu Products Company, Incorporated of Rancho Cucamonga California, the assignee of the subject application, as their model 60FA-BE forced air propane gas portable heater. In this connection, the purpose of this invention is to provide an improved small forced air gas heater of this type which has significantly improved BTU output per cubic inch of size, is lower in cost, easier to service, and simpler in construction, and which provides more efficient heating, cleaner combustion and quieter operation.

SUMMARY OF THE INVENTION

In general, a compact forced air heater in accodance with the invention comprises a combustion chamber mounted in a housing, a burner module mounted across a back open end of the combustion chamber adjacent a back wall of the housing, for introducing fuel, mixing fuel and air, igniting the fuel mixture and stabilizing the flame in the combustion chamber, and an air intake in a front wall of the housing. A forced air blower is located between the combustion chamber and the housing front end wall for drawing air through the air intake and the housing in one direction into a rear space in back of the combustion chamber, and then past and through the burner module in an opposite direction into the combustion chamber; drawing heated air produced in the combustion chamber by the burner module out of the combustion chamber; and exhausting the heated air into a space to be heated.

The burner module, which is of special construction, includes a flameholder plate mounted across the back open end of the combustion chamber and having a large central primary air hole and secondary air holes surrounding the primary air hole. A flamespreader plate is mounted on the flameholder plate opposite the primary air hole, and an elongated burner tube is located adjacent an opposite side of the flameholder plate and has at least one burner orifice in a sidewall of the tube in alignment with the primary air hole and the flamespreader plate. The flameholder plate also includes an igniting device for igniting fuel emanating from the burner orifice of the burner tube after it has mixed with air in the vicinity of the flamespreader.

More specifically, the secondary air holes may form one or more circular rows or concentric circles located outside an imaginary line on the flameholder plate defined by extending a periphery of the flamespreader plate axially to the flameholder plate, with the holes in each alternating row in staggered relationship to the holes in the adjacent row(s). A closed end of an end section of the elongated burner tube, which includes the burner orifice, is of a flattened configuration and is secured onto the flameholer plate to orient the burner orifice into alignment with the primary air hole in the flameholder plate and the flamespeader plate. The burner tube also includes an inlet section extending from the end section for connection to a fuel control valve adjacent the housing front end, with the end and inlet tube sections being integrally connected by an intermediate tube section. Corners of the flameholder plate may be bent obliquely or directly downstream with respect to the air flow into the combustion chamber, to enhance the mixing of the flame and the combustion air so as to provide cleaner combustion. Preferably, the forced air blower has a high speed, on the order of at least 3,000 rpm, and air flow about the flameholder plate into the combustion chamber is above approximately 1200 fpm.

DETAILED DESCRIPTION OF THE DRAWINGS

Figure 1:
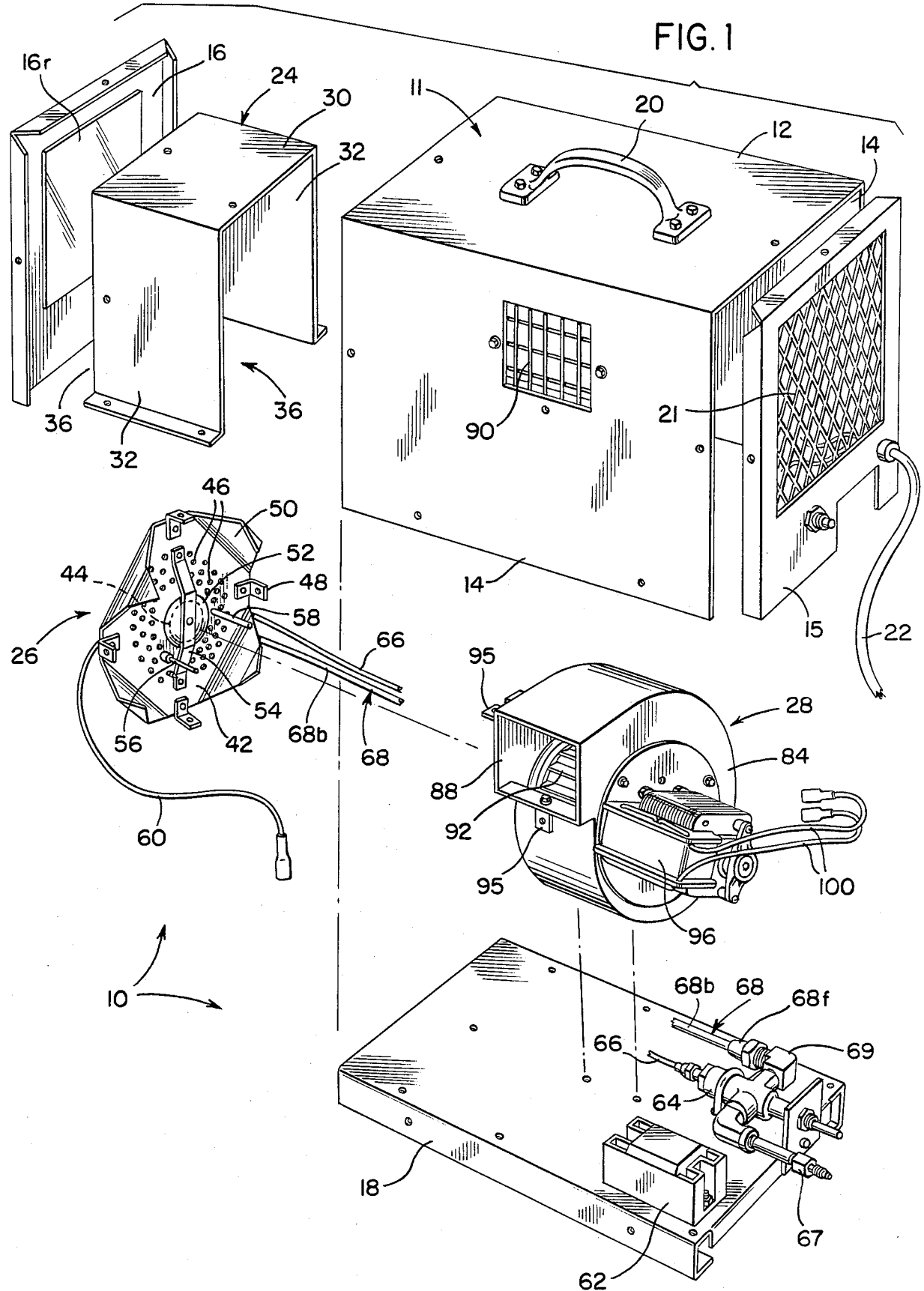
FIG. 1 is an isometric exploded view of a compact forced air heater in accordance with the invention.
Figure 2:
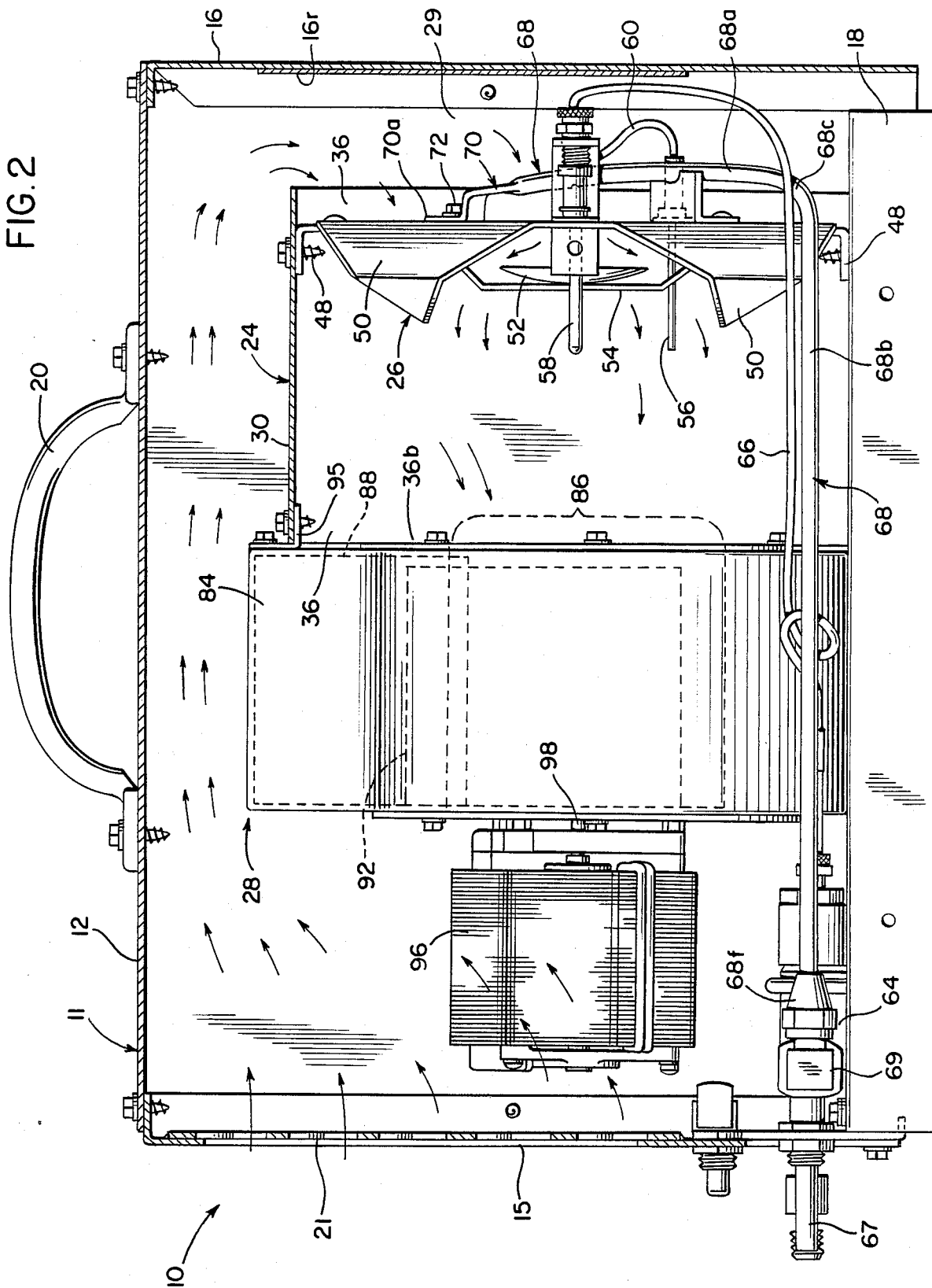
FIG. 2 is a cross-sectional view of the compact forced air heater shown in FIG. 1, in an assembled condition.
Figure 3:
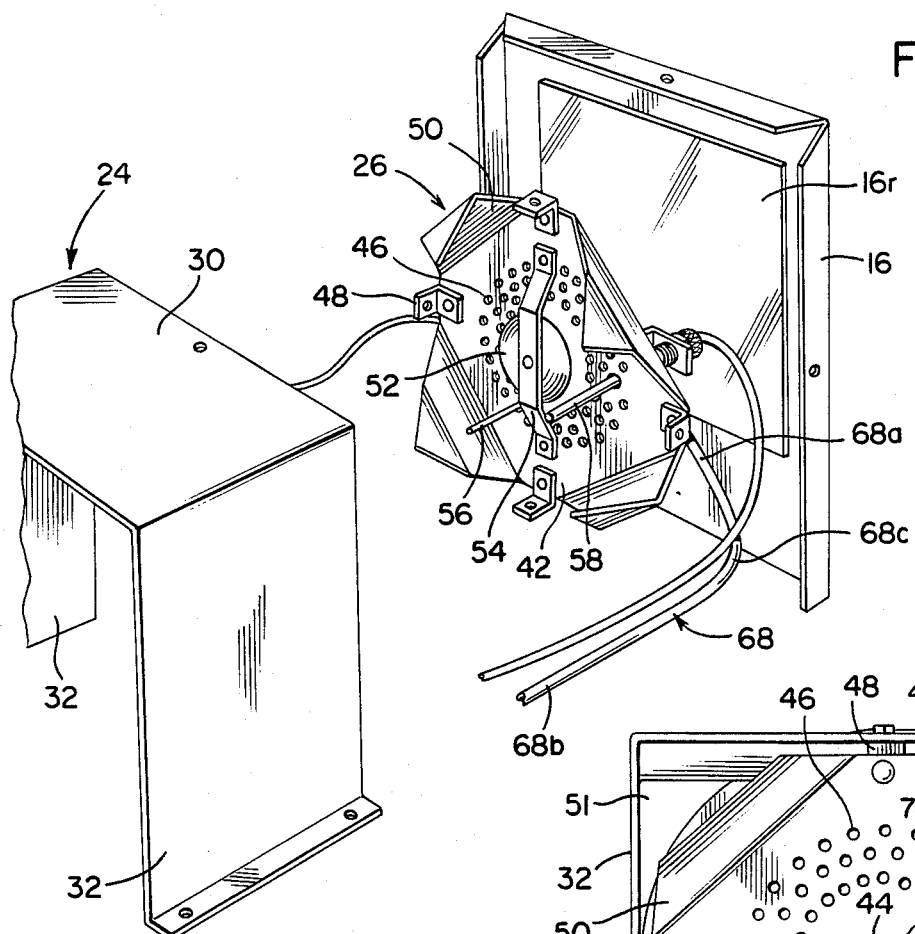
FIG. 3 is a partial isometric exploded view of the back end of the compact forced air heater shown in FIG. 1.

In general, referring to FIGS. 1 and 2 of the drawings, a forced air heater 10 in accordance with the invention includes an outer housing 11 having a top wall 12 integrally connected to two sidewalls 14, a front end plate 15, a rear end plate 16 and a base plate 18. The heater 10 is of a portable type and includes a carrying handle 20 provided on the top wall 12. The front plate 15, having an air intake screen 21 secured thereon, is mounted at the front end of the housing 11 and a power cord 22 (FIG. 1) extends into the housing 11 through the front end plate 15. The integrally connected top wall 12 and sidewalls 14 are secured to the base plate 18, front end plate 15 and rear end plate 16 by screws.

As described above, the forced air heater 10 is of a generally known type. However, in accordance with this invention, the forced air heater 10 is of a smaller more compact configuration (e.g., 12×7×9 inches), which produces a BTU output per cubic inch on the order of 2½ times that of prior known heaters (e.g., 40 BTU per cubic inch versus 16 BTU per cubic inch.) More specifically, the heater 10 further includes a rear combustion chamber 24, a burner module or assembly 26 mounted across the back of the combustion chamber, and a forced air blower 28 mounted within the housing 11 on the base plate 18 between the combustion chamber and the front end plate 15. The general flow of air through the heater 10, when the heater is in operation, is indicated by arrows in FIG. 2, namely, from the air intake 21 through the housing 11 above the blower 28 and the combustion chamber 24 in one direction to a rear space 29 behind the combustion chamber, and then in an opposite direction past and through the burner module 24 into the combustion chamber. The rear end plate 16 of the housing 11 also has a metal heat reflector 16r mounted thereon, to reflect outwardly radiating heat back into the housing.

The combustion chamber 24 is of essentially box-shaped construction and includes a top wall 30, sidewalls 32 and front and back open ends 36. The burner module 26 is mounted across the back open end 36 of the combustion chamber 24 in a vertical position. The air velocity around the burner module 26 into the combustion chamber 24 preferably is above 1200 ft./minute; therefore, the capacity of the forced air blower 28, and the size of the spaces between the outer dimensions of the combustion chamber 24 and the housing 11, and between the combustion chamber and the burner module 26, are importat, and are chosen so that flow passage between the combustion chamber and a flameholder plate 42 of the burner module 26 attains such a velocity. The combustion chamber 24 also acts as a conduit between the burner module 26 and the blower 28, and must be of a length sufficient to accommodate a complete combustion process.

Figure 5:
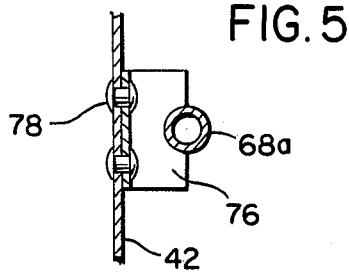
FIG. 5 is a cross-sectional view taken along the line 5—5 of FIG. 4.

The flameholder plate 42 of the burner module 26 is of a configuration which allows the flame size to be reduced, while maintaining good combustion performance and a relatively low sound level. In this regard, the flameholder plate 42 may be of square or circular configuration, having a large central primary air hole 44 formed in a planar portion thereof, and a plurality of secondary air holes 46 formed in the planar portion in the shape of one or more circular rows for the passage of air therethrough. The flameholer plate 42 also is provided at its corners with mounting brackets 48 for securing the flameholder plate in a vertical position to the walls 30, 32 of the combustion chamber 24 and the housing base plate 18. Preferably, for best performance the diameter of the primary air hole 44 is between 0.5 and 0.75 inches, and the secondary air holes 46 have a diameter of approximately ⅛ inch and are spaced approximately 0.3 inch apart. The secondary air holes 46 in alternate circular rows are staggered with respect to the air holes in the adjacent row(s), as is best shown in FIGS. 1 and 5.

The flameholder plate 42 also has ears 50 formed by bending plate corners downstream with respect to air flow into the combustion chamber 24 and outward at about 45°, and then again downstream and inwards at about 90°, in a V-shaped configuration consisting of an inner larger segment and a smaller tip segment. This bending is such as to place the ears 50 in the path of the flame generated by the burner module 26, causing the ears to act as afterburners and thereby improve combustion cleanliness and properly direct tertiary combustion air. The ears 50 also increase the turbulence of the air around the burner module 26 to enhance the mixing of the flame and the combustion air. In addition, the ears 50 partially block corners 51 (best shown in FIG. 4) between the flameholder plate 42 and the combustion chamber back open end 36 to force air to flow through the primary air hole 44 and the secondary air holes 46, and also to confine this air in the vicinity of the flame, thereby creating turbulence which enhances fuel-air mixing to provide more complete combustion. At the same time, the unblocked portions of the combustion chamber corners 51 permit air to flow around the flameholder plate 42 to provide tertiary air for combustion and cooling. In other words, there should be a balance of air through the primary air hole 44 and the secondary air holes 46 to the flame, and around the flameholder plate 42 at the combustion chamber corners 51.

A flamespreader plate 52 is mounted on an inner side of the flameholder plate 42 opposite the primary air hole 46 by a bracket member 54 having the flamespreader plate secured to a central portion thereof, and having opposite leg portions suitably secured to the flameholder plate. Preferably, the diameter of the flamespreader plate 52 is between 1.5 and 2.5 inches, and the axial spacing of the flamespreader plate from the flameholder plate 42 is between 0.5 and 0.75 inches. The first circular row of secondary air holes 46 should have a greater diameter than the flamespreader plate 52, such as a diameter of approximately 2.25 to 2.75 inches (i.e., the first circular row will be located outside an imaginary line defined by extending a periphery of the flamespreader plate 52 axially to the flameholder plate 42). The outermost peripheral dimension (i.e., maximum transverse direction or diameter) of the flameholder plate 42 should be 30–40% larger than the diameter of the outermost circular row of the secondary air holes 46. Larger heaters 10 may have more circular rows; however, too many rows will cause poorer performance and, therefore, the number of rows for a particular size flameholder plate 42 is critical.

The burner module 24 further includes an ignitor electrode 56 and a flamesensor 58 suitably mounted on the flameholder plate 42. The ignitor electrode 56 may be a direct spark device located closely adjacent the flamespreader plate mounting bracket 54, and wired by a lead 60 to a terminal box 62 at the front of the heafter 10, so as to be energized automatically when the heater is plugged into an electrical source. The flamesensor 58 functions as a flame sensing device for maintaining a fuel control valve 64 at the front of the heater 10 open when the flame is present. The control valve 64 is connectable to a suitable gas fuel source (not shown) by a fitting 67.

Figure 4:
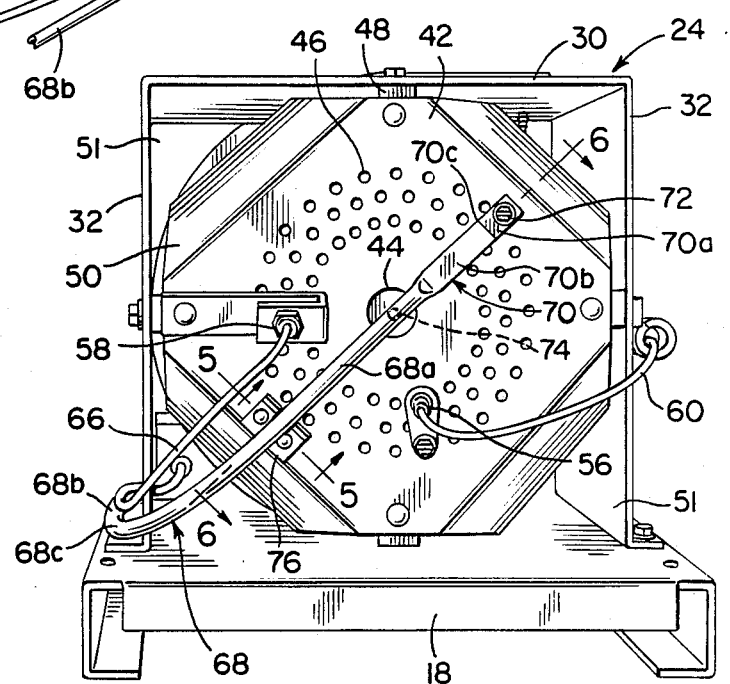
FIG. 4 is a partial rear elevational view of the embodiment of the invention shown in FIG. 3.
Figure 6:
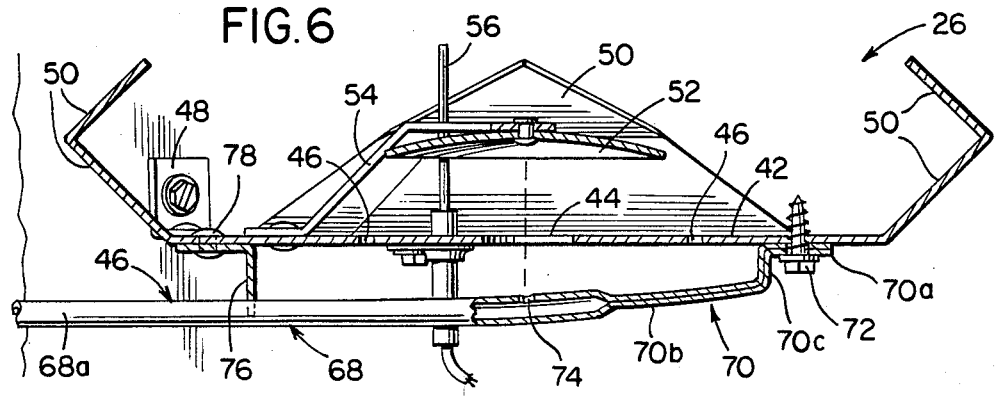
FIG. 6 is a cross-sectional view taken along the line 6—6 of FIG. 4.
Figure 7:
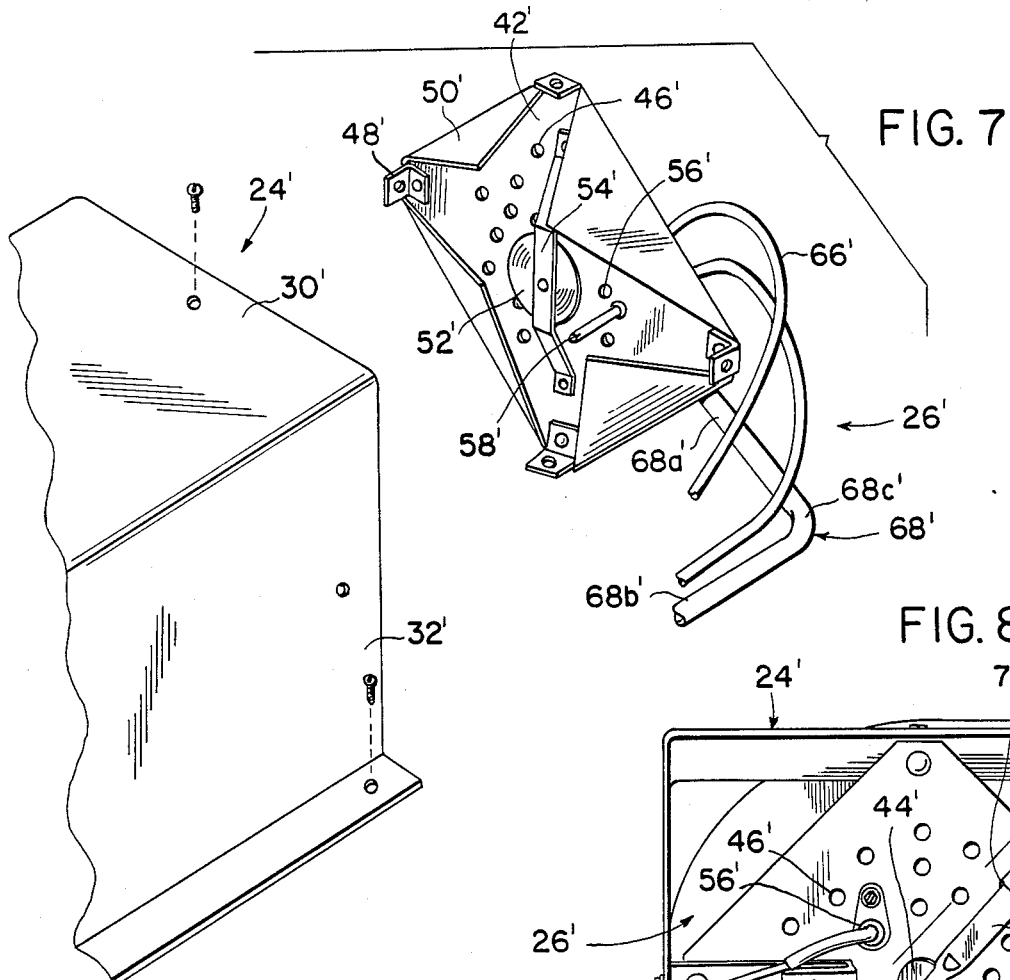
FIG. 7 is a partial isometric exploded view of another embodiment of the invention.

The burner module 26 further includes an elongated burner tube 68 having an open end provided with a fitting 68f (FIG. 2) for connection of the burner tube to a fitting 69 of the control valve 64. As is best shown in FIGS. 4 and 6, the elongated burner tube 68 also has a closed flattened end 70 which includes a longitudinally extending flat mounting portion 70a receivable against a flat surface portion of the burner flameholder plate 42, a longitudinally extending portion 70b, and a right-angle spacer portion 70c. The flat mounting portion 70a is secured to the flat outer side of the flameholder plate 42 by a screw 72.

Referring to FIG. 6, the elongated burner tube 68 is provided with at least one burner orifice 74 in a sidewall of the tube and in alignment with the central primary air hole 44 in the flameholder plate 42. The elongated burner tube 68 also includes a first end section 68a, which includes the closed flattened end 70 and the burner orifice 74, a second elongated inlet section 68b, which includes the fitting 68f, and a curved, right-angle intermediate tube section 68c connecting the first and second sections. In a preferred embodiment, the axial spacing of the burner orifice 74 of the tube 68 from the hole in the flameholder plate 42 is from 0.4 to 1.0 inches.

Adjacent one edge of the flameholder plate 42, a channel-shaped member 76, having a laterally projecting mounting flange, is secured to the flameholder plate, such as by rivets 78, so that the first end section 68a of the elongated burner tube 68 is received in a seat formed by the channel-shaped member. Thus, the mounting section 70a at the flattened end 70 of the elongated burner tube 68, and its associated screw 72, and the channel-shaped member 76, cooperate to ensure proper alignment of the elongated burner tube, to locate the burner orifice 74 of the tube in proper position on the flameholder plate 42 in alignment with the central primary air hole 44 therethrough and in opposed relationship to the flamespreader plate 52.

Referring again to FIGS. 1 and 2, the forced air blower 28, which is of a known type, includes a housing 84 having an open air-intake opening 86 (FIG. 2) located essentially centrally of the combustion chamber 24, and a discharge opening 88 (best shown in FIG. 1) which is aligned with a discharge opening 90 (FIG. 1) in one of the sidewalls 14 of the outer housing 11. The blower 28 further includes an annular-shaped blower wheel 92 (FIG. 1) within the housing 84. The blower wheel 92 is located in the blower housing 84 essentially centrally of the combustion chamber 24 so as to draw heated air from the combustion chamber into the blower housing, and then discharge the heated air through the blower housing discharge opening 88 and the outer housing discharge opening 90 into the space to be heated. The blower housing 84 is directly supported on the base plate 18 and secured thereto by screws, not shown, and is secured to the housing sidewall 14 and the combustion chamber top wall 30, by mounting brackets 95.

A blower drive motor 96 is supported on a closed end wall of the blower housing 84 on an opposite side thereof from the blower wheel 92, and includes a drive shaft 98 (FIG. 2) on which the blower wheel is supported, and leads 100 connectable to suitable terminals (not shown). For compactness, the wheel 92 should operate a high speed, having a speed above 3000 rpm, as compared to prior art heaters of this type, which use blower wheel speeds of about 1500 rpm. Further, as is indicated by the arrows at the left-hand side of FIG. 2, during operation of the heater 10, the blower device 28 causes relatively cool ambient air to be drawn into the housing 11 through the air-intake screen 21 upward past the blower drive motor 96, prior to the air entering the combustion chamber 24, thereby simultaneously cooling the motor when the heater is in operation.

FIGS. 7–10 disclose another embodiment of the invention essentially as disclosed in my copending application Ser. No. 029,010, filed Mar. 23, 1987, the disclosure of which, to the extent not inconsistent with this disclosure, is hereby incorporated by reference. In this embodiment of the invention, a burner module or assembly 26' of a slightly different configuration is mounted on the back of a combustion chamber 24', in place of the burner module 26 as in the embodiment of the invention shown in FIGS. 1–6.

Figure 8:
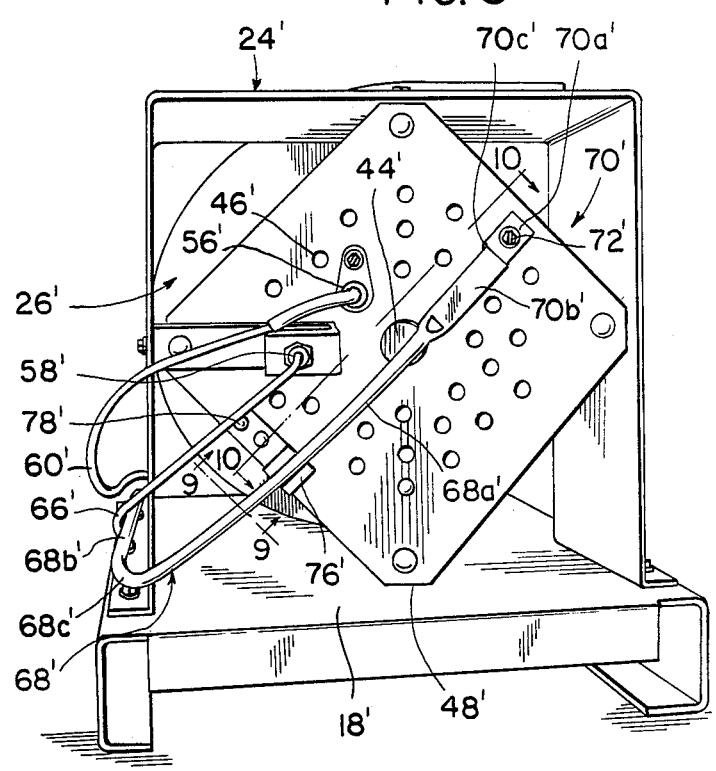
FIG. 8 is a partial rear elevational view of the embodiment of the invention shown in FIG. 7.
Figure 9:
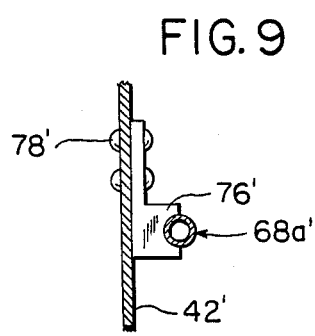
FIG. 9 is a cross sectional view taken along the line 9—9 in FIG. 7.

The burner module 26' includes a flameholder plate 42' of square configuration, having a large central primary air hole 44' and smaller secondary air holes 46' formed therein for the passage of air therethrough. The flameholder plate 42' also is provided at its corners with mounting brackets 48' for securing the flameholder plate to walls of the combustion chamber 24' and a housing plate 18' (FIG. 8). Further, the flameholder plate 42' has ears 50' bent downstream and then inward at about 135° to place the ears in the flame generated by the burner module 24', causing the ears to act as afterburners to improve combustion and combustion cleanliness. A flamespreader plate 52' is mounted on an inner side of the flameholder plate 42' by a bracket member 54' having the flamespreader plate secured to a central portion thereof, and having opposite leg portions suitably secured to the flameholder plate. The burner module 24' further includes an ignitor 56' and a thermocouple 58' suitably mounted on the flameholder plate 42'.

Figure 10:
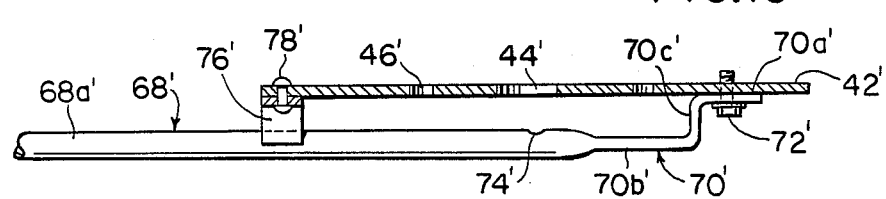
FIG. 10 is a cross sectional view taken along the line 10—10 in FIG. 7.

The embodiment of the invention shown in FIGS. 7–10 further includes an elongated burner tube 68' having an open front end provided with a fitting (not shown) for connection of the burner tube to a control valve (not shown). As is best shown in FIGS. 8 and 10, the burner tube 68' has a closed flattened opposite end 70' which includes a flat mounting portion 70a', a longitudinally extending portion 70b', and a right-angle spacer portion 70c'. The flat mounting portion 70a' is receivable against and secured to a flat surface portion of the outer side of the flameholder plate 42' by a screw 72'.

Referring to FIG. 10, the elongated burner tube 68' is provided with a single burner orifice 74' in a sidewall of the tube and in alignment with the central primary air hole 44' in the flameholder plate 42'. The elongated burner tube 68' also includes a first section 68a', which includes the closed flattened end 70' and the single burner orifice 74', a second elongated section 68b', which includes the abovementioned fitting (not shown), and a curved right-angle section 68c' interconnecting the first and second sections.

Adjacent one edge of the flameholder plate 42', a channel-shaped member 76', having a laterally projecting mounting flange, is secured to the flameholder plate, such as by rivets 78', so that the first section 68a' of the elongated burner tube 68' is received by a seat formed by the channel-shaped member. Thus, the flat mounting portion 70a' at the flattened end 70' of the elongated burner tube 68', and its associated screws 72', and the channel-shaped member 76', cooperate to ensure proper location, orientaton and alignment of the elongated burner tube, to locate the single burner orifice 74' of the tube in proper position on the flameholder plate 42' in alignment with the central aperture 44' therethrough and in opposed relationship to the flamespreader plate 52'.

In summary, applicant has provided a new and improved forced air-type portable heater 10 which is of very compact simplified construction, has greater heating efficiency, and efficient combustion, and in which intake air is used to eliminate hot spots in the heater, to achieve a significantly improved BTU output per cubic inch on the order of 2½ times that of prior known heaters. The heater 10 includes the air intake 21, the high speed forced air blower 28 and the combustion chamber 24 arranged sequentially from the front to the back thereof, with the burner module 26 arranged vertically in the back open end of the combustion chamber and spaced from the heat reflective surface 16r on the rear housing wall 16. Thus, the forced air blower 28 can draw air into the housing 11 through the air intake 21, past the blower drive motor 96 to the rear space 29 in the housing in one direction, and then in a reverse direction into the combustion chamber 24 past and through the burner module 26, for combustion. The heated air then is drawn from the combustion chamber 24 by the blower 28 and exhausted through the housing opening 90 into the space to be heated. Further, the burner module 26 is of a unique construction, comprising the flameholder plate 42 provided with the central primary air hole 44 surrounded by the circular rows of staggered secondary air holes 46, and the elongated right-angle bent burner tube 68 having the flattened mounting and orienting portion 70a for locating the burner orifice 74 in alignment with the primary air hole 44 and the flamespreader plate 52. The flameholder plate 42 also includes the inwardly bent ears 50 which function as afterburners and facilitate air circulation to enhance the combustion process. The net result is a forced air heater of a smaller, more compact configuration which produces a BTU output per cubic inch on the order of 2½ times that of prior known heaters.

What is claimed is:

1. A compact forced air heater, which comprises:
   a housing;
   a combustion chamber mounted in said housing and having spaced parallel front and back open ends;
   a burner module mounted across the back open end of said combustion chamber adjacent a back end wall of said housing, for introducing fuel, mixing fuel with combustion air, igniting said fuel-air mixture and stabilizing the resulting flame in said combustion chamber;
   an air intake in a front wall of said housing; and
   forced air blower means mounted across the front open end of said combustion chamber between said combustion chamber and the front wall of said housing, for drawing air through said air intake and through said housing in one direction into a rear space in back of said combustion chamber, and then in an opposite direction past and through said burner module into said combustion chamber, said forced air blower means also drawing heated air from said combustion chamber, and exhausting the heated air into a space to be heated.

2. The compact forced air heater as recited in claim 1, wherein said forced air blower means has a speed of at least 3,000 rpm.

3. The compact forced air heater as recited in claim 1, wherein said back end wall of said housing includes a heat reflecting member for reflecting outwardly radiating heat back into said housing.

4. The compact forced air heater as recited in claim 1, in which said burner module comprises:
   a flameholder plate mounted across the back open end of said combustion chamber, said flameholder plate having a large central primary air hole and a plurality of smaller secondary air holes surrounding the primary air hole;
   a flamespreader plate mounted adjacent one side of said flameholder plate opposite the primary air hole;
   a burner tube located adjacent an opposite side of said flameholder plate and having at least one burner orifice in a sidewall of the tube in alignment with the primary air hole and the flamespreader plate; and
   igniting means for igniting fuel emanating from the burner orifice and passing through the flameholder plate adjacent to the flame spreader plate.

5. The forced air heater as recited in claim 4, in which:
   said flameholder plate has peripheral portions spaced from wall portions of said combustion chamber; and
   said air blower means produces air flow between said flameholder plate peripheral portions and said combustion chamber wall portions, from said rear space in said housing into said combustion chamber, at a rate above approximately 1200 fpm.

6. The compact forced air heater as recited in claim 4, in which the secondary air holes in said flameholder plate are located outside an imaginary line on said flameholder plate defined by extending a periphery of said flamespreader plate axially to said flameholder plate.

7. The forced air heater as recited in claim 6, in which the secondary air holes in said flameholder plate are located in circular rows about the central primary air hole in the plate.

8. The compact forced air heater as recited in claim 4, in which the spacing of the burner orifice in said burner tube from the central primary air hole in said flameholder plate is in range on the order of 0.4 to 1.0 inches.

9. The compact forced air heater as recited in claim 8, in which:
   said flamespreader plate has a diameter in a range on the order of 1.5 to 2.5 inches;
   the central primary air hole in said flameholder plate has a diameter in a range on the order of 0.5 to 0.75 inches;
   the spacing of the central primary air hole in said flameholder plate from said flamespreader plate is in a range on the order of 0.5 to 0.75 inches;
   the secondary air holes in said flameholder plate are approximately ⅛ inch in diameter and approximately 0.3 inch apart, with the secondary air holes in alternate rows staggered with respect to one another;
   the inner circular row of secondary air holes in said flameholder plate has a diameter on the order of 2.25 to 2.75 inches;
   the outer circular row of secondary air holes in said flameholder plate has a diameter in a range on the order of 3.5 to 6.0 inches; and
   said flameholder plate has a periphery located from the center of the plate a distance on the order 30 to 40% larger than the diameter of the outer circular row of secondary air holes.

10. A compact forced air heater, which comprises:

a housing;

a combustion chamber mounted in said housing and having a back open end;

a burner module mounted across the back open end of said combustion chamber adjacent a back end wall of said housing, for introducing fuel, mixing fuel with combustion air, igniting said fuel-air mixture and stabilizing the resulting flame in said combustion chamber;

an air intake in a front wall of said housing;

forced air blower means between said combustion chamber and the front wall of said housing, for drawing air through said air intake and through said housing in one direction into a rear space in back of said combustion chamber, and then in an opposite direction past and through said burner module into said combustion chambeer, said forced air blower means also drawing heated air from said combustion chamber, and exhausting the heated air into a space to be heated;

a flameholder plate of said burner module mounted across the back open end of said combustion chamber, said flameholder plate having a large central primary air hole and a plurality of smaller secondary air holes surrounding the primary air hole;

a flamespreader plate of said burner module mounted adjacent one side of said flameholder plate opposite the primary air hole;

a burner tube of said burner module located adjacent an opposite side of said flameholder plate and having at least one burner orifice in a sidewall of the tube in alignment with the primary air hole and the flameholder plate; and igniting means forming part of said burner module, for igniting fuel emanating from the burner orifice and passing through the flameholder plate adjacent to the flamespreader plate;

said flameholder plate having peripheral portions bent over in a direction extending from said burner tube toward said flamespreader plate to promote mixing and to function as afterburners.

11. The compact forced air heater as recited in claim 10, in which said flameholder plate bent-over portions are in two segments, said segments including a larger segment which is inclined from the plate, and then a smaller tip segment which is bent inward relative to said larger segment and forming a V-shaped configuration.

12. A burner module for a forced air gaseous fuel heater, which comprises:

a flameholder plate, at least a portion of said flameholder plate being of planar construction and having a large central primary air hole and a plurality of smaller secondary air holes surrounding the primary air hole;

a flamespreader plate mounted adjacent one side of said flameholder plate essentially parallel to and spaced from the at least one planar portion of said flameholder plate, and concentric with the primary air hole in the at least one planar portion;

a burner tube, said burner tube being located adjacent to the flameholder plate but on an opposite side of said flameholder plate from the flamespreader plate and having at least one fuel orifice having a central axis in alignment with and perpendicular to the primary air hole and said flamespreader plate; and igniting means for igniting fuel emanating from the fuel orifice of said burner tube.

13. The burner module as recited in claim 12, in which the secondary air holes in said flameholder plate are located outside an imaginary line on said flameholder plate defined by extending a periphery of said flamespreader plate axially to said flameholder plate.

14. The burner module as recited in claim 13, in which the secondary air holes in said flameholer plate are located in circular rows about the central primary air hole in the plate.

15. The burner module as recited in claim 12, in which the spacing of the burner orifice in said burner tube from the central primary air hole in said flameholder plate is in a range on the order of 0.4 to 1.0 inches.

16. The burner module as recited in claim 15, in which:

said flamespreader plate has a diameter in a range on the order of 1.5 to 2.5 inches;

the central primary air hole in said flameholder plate has a diameter in a range on the order of 0.5 to 0.75 inches;

the spacing of the central primary air hole in said flameholder plate from said flamespreader plate is in a range on the order of 0.5 to 0.75 inches;

the secondary air holes in said flameholder plate are approximately ⅛ inch diameter and approximately 0.3 inch apart, with the secondary air holes in alternate rows staggered with respect to one another;

the inner circular row of secondary air holes in said flameholder plate has a diameter on the order of 2.25 to 2.75 inches;

the outer circular row of secondary air holes in said flameholder plate has a diameter in a range on the order of 3.5 to 6.0 inches; and said flameholder plate has a periphery located from the center of the plate a distance on the order of 30 to 40% larger than the diameter of the outer circular row of secondary air holes.

17. A burner module for a forced air gaseous fuel heater, which comprises:

a flameholder plate, said flameholder plate having a large central primary air hole and a plurality of smaller secondary air holes surrounding the primary air hole;

a flamespreader plate mounted adjacent one side of said flameholder plate and concentric with the primary air hole, with said flameholder plate having peripheral portions bent over in a direction extending from said burner tube toward said flamespreader plate to function as air combustion enhancers and afterburners;

a burner tube, said burner tube being located adjacent to the flameholder plate but on an opposite side of said flameholder plate from the flamespreader plate and having at least one fuel orifice having a central axis in alignment with and perpendicular to the primary air hole and said flamespreader plate; and igniting means for igniting fuel emanating from the fuel orifice of said burner tube.

18. The burner module as recited in claim 17, wherein said flameholder plate bent-over portions are in two segments, said segments including a larger segment which is intitially inclined from the plate and then a smaller tip segment which is bent inward relative to said larger segment and forming a V-shaped configuration.

19. A compact forced air heater, which comprises:

a housing;

a combustion chamber mounted in said housing and having a back open end;

a burner module mounted across the back open end of said combustion chamber adjacent a back end wall of said housing, for introducing fuel, mixing fuel with combustion air, igniting said fuel-air mixture and stabilizing the resulting flame in said combustion chamber;

an air intake in a front wall of said housing;

forced air blower means between said combustion chamber and the front wall of said housing, for drawing air through said air intake and through said housing in one direction into a rear space in back of said combustion chamber, and then in an opposite direction past and through said burner module into said combustion chamber, said forced air blower means also drawing heated air from said combustion chamber, and exhausting the heated air into a space to be heated;

a flameholder plate of said burner module mounted across the back open end of said combustion chamber, said flameholder plate having a large central primary air hole and a plurality of smaller secondary air holes surrounding the primary air hole;

a flamespreader plate of said burner module mounted adjacent one side of said flameholder plate opposite the primary air hole;

a burner tube of said burner module located adjacent an opposite side of said flameholder plate and having at least one burner orifice in a sidewall of the tube in alignment with the primary air hole and the flamespreader plate;

igniting means forming part of said burner module, for igniting fuel emanating from the burner orifice and passing through the flameholder plate adjacent to the flamespreader plate;

a flattened end portion on a first end section of said burner tube downstream of said burner orifice, said flattened end portion being mounted against said flameholder plate to orient the burner orifice into alignment with the primary air hole in said flameholder plate; and an elongated second inlet section of said burner tube extending upstream of said burner orifice and having a fuel coupling fitting at one end thereof, said first end section and said second inlet section being integrally connected by an intermediate burner tube section.

20. A burner module for a forced air gaseous fuel heater, which comprises:

a flameholder plate, said flameholder plate having a large central primary air hole and a plurality of smaller secondary air holes surrounding the primary air hole;

a flamespreader plate mounted adjacent one side of said flameholder plate and concentric with the primary air hole;

a burner tube, said burner tube being located adjacent to the flameholder plate but on an opposite side of said flameholder plate from the flamespreader plate and having at least one fuel orifice having a central axis in alignment with and perpendicular to the primary air hole and said flamespreader plate;

igniting means for igniting fuel emanating from the fuel orifice of said burner tube;

a flattened end portion on a first end section of said burner tube downstream of the fuel orifice, said flattened end portion being mounted against said flameholder plate to orient the fuel orifice with respect to the central primary air hole in said flameholder plate; and an elongated second inlet section of said burner tube extending upstream of said orifice and having a fuel coupling fitting at one end thereof, said first end section and said second inlet section being integrally connected by an intermediate burner tube section.

21. A forced air heater, which comprises:

a base plate;

a combustion chamber mounted on the base plate;

a burner for producing heated air in the combustion chamber;

forced air blower means located adjacent the combustion chamber for drawing unheated air into the combustion chamber for heating, and for drawing heated air into a space to be heated;

an elongated burner tube forming part of the burner, the elongated burner tube having opposite open and closed ends, and including a single burner orifice located in a sidewall of the tube between the open and closed ends and facing generally toward the forced air blower means;

a flat flamespreader plate located between the single burner orifice and the forced air blower means in opposed relationship to the single burner orifice;

burner tube locating-and-orienting means mounted on the burner, the locating-and-orienting means including a member having an essentially channel shaped configuration mounted on the burner, and the closed end of the burner tube having a flattened configuration and being receivable against a flat surface portion of the burner;

a blower drive motor forming part of the forced air blower means; and flow-directing means for causing the unheated air which is drawn into the combustion chamber to flow initially past the blower drive motor and thereby simultaneously cause cooling of the blower driver motor when the heater is in operation.

22. The forced air heater as recited in claim 21, wherein:

the burner is mounted at a rear side of the combustion chamber;

a portion of the burner tube extends essentially parallel to the rear side of the combustion chamber; and the burner tube locating-and-orienting means also includes a securing device for securing the flattened closed end of the burner tube to the flat surface portion of the burner.

23. The forced air heater as recited in claim 22, wherein:

the elongated burner tube extends from a front portion of the heater to the rear side of the combustion chamber, and is formed with a right-angle bend adjacent a juntion between the rear side of the combustion chamber and a sidewall of the combustion chamber.

24. The forced air heater as recited in claim 21, wherein:

the burner includes a perforated flameholder plate having the flamespreader plate, an ignitor and a thermocouple mounted on the perforated flameholder plate.

25. The forced air heater as recited in claim 24, wherein:

the perforated flameholder plate has downstream inwardly directed ears which function as afterburners.

* * * * *